June 22, 1926.
E. LORCH
1,590,103
DOUGH KNEADING MACHINE
Filed Feb. 28, 1924  2 Sheets-Sheet 1
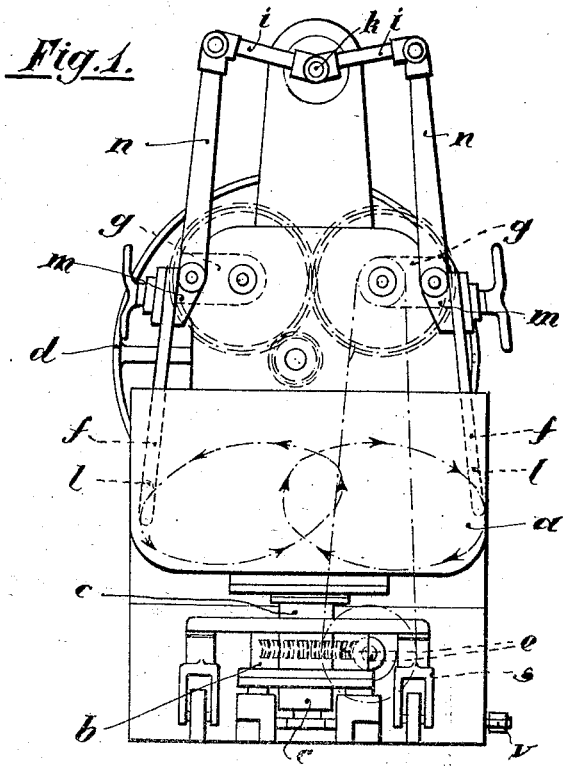
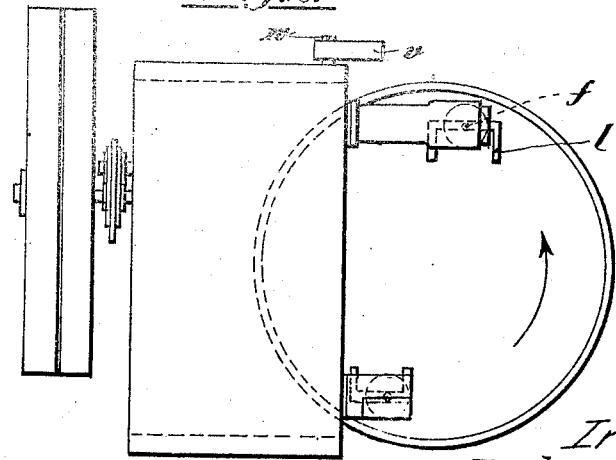
Inventor
Emil Lorch
by Langner, Parry, Card & Langner
Attys.

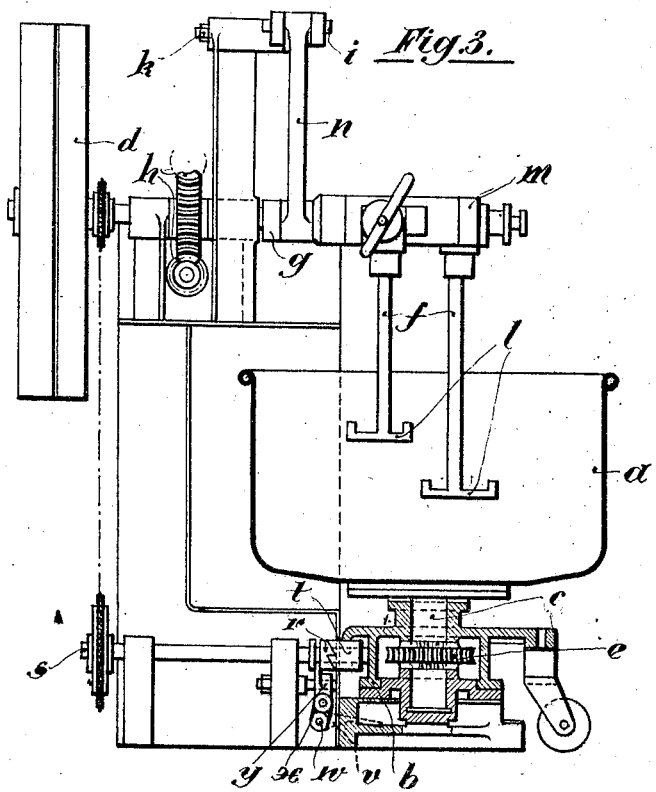
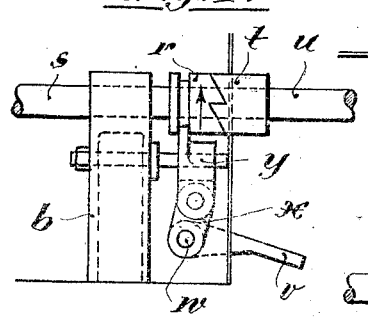
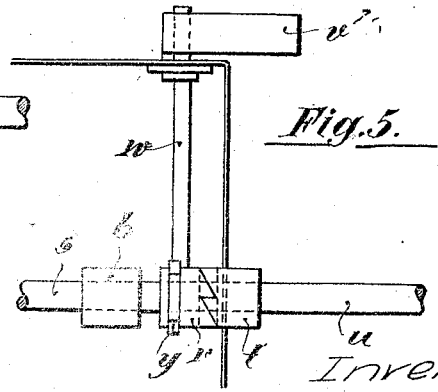

Patented June 22, 1926.

1,590,103

UNITED STATES PATENT OFFICE.

EMIL LORCH, OF WINNENDEN, WURTEMBERG, GERMANY.

DOUGH-KNEADING MACHINE.

Application filed February 28, 1924. Serial No. 695,789.

The present invention relates to dough-kneading machines, in which the dough is worked by two kneaders. Compared with the known machines of this kind the kneading machine according to the present invention is chiefly distinguished by the dough being worked in a proper workmanlike manner, as the bakers' way of working is imitated. This is effected by the two working operations by which the complete working of the dough is accomplished, that is to say first mixing and kneading of the material forming the dough and thereupon drawing out and airing the dough are not only carried out by the machine, but the second operation is automatically begun and completed when the first operation ends, that is the dough is sufficiently mixed and thoroughly kneaded.

The essential characteristic of the invention is that the dough is first thoroughly kneaded by kneading arms arranged so that by their engaging in the dough they tend to rotate the kneading trough in a certain direction. The kneading trough however, is positively set in rotation against this tendency. In the impulsion device of the kneading trough, however, a coupling is introduced which is so formed that it is automatically released, as soon as the resistance of the trough that increases through the increasing toughness of the dough in the kneading is great enough, that is to say as soon as the dough is fully kneaded. The positive impulsion device is thus automatically put out of engagement so that now the airing and drawing action of the kneading arms is exercised.

In view of the automatic introduction and carrying out of the second working operation, the kneading arms do not as hitherto engage in the middle plane of the kneading-trough, but in front of and behind the same. Consequently the kneading "shoes" do not work against one another but past one another and thereby exercise an eccentric action, which is caused by the arms tending to rotate the trough in opposition to the mechanical impulsion device, which is arranged to rotate loosely, but is always in connection with the machine driving gear through the automatically disengaging coupling.

In machines of the kind hitherto employed moreover the upper connecting points are arranged to move up and down for which a special impulsion device and a correspondingly troublesome arrangement is necessary, whilst according to the present invention, a single fixed pin is arranged for rotating the rods which are connected with the upper end of the kneading arms. The movement of the kneading arms is effected in a known manner by means of cranks, which move the arms to and fro and up and down at the same time. The different movements combine, in consequence of the arrangement of the connecting rods oscillating around a fixed point, and constitute such a movement that the kneaders execute a movement similar to that which takes place when the dough is thoroughly worked by hand, that is to say the kneading arms execute elliptical movements inwards and outwards in a perpendicular plane, in connection wherewith the kneaders work adjacently to one another and pass by one another in working.

The object of the present invention is illustrated in one example of construction in the drawing:—

Fig. 1 is a front elevation of the kneading machine.

Fig. 2 is a plan.

Fig. 3 is a side elevation, the lower part in axial section.

Figs. 4 and 5 are respectively a side elevation and a plan of the coupling.

The dough to be worked is in a circular trough $a$ and the latter is mounted in the frame $b$ with an axle-pin $c$ so as to rotate loosely, but is positively rotated by the machine driving device $d$ through the medium of worm and worm-wheel $e$ in the direction indicated by the arrow in Figure 2.

The working of the dough is effected by two kneading arms $f$, one of which is situated in front of and the other behind the axis of rotation of the trough $a$ and which work in different planes in front of and behind the middle axis, that is to say work past one another. The kneading arms $f$ are suspended on cranks $g$ which for example are driven from the driving shaft through a screw or worm gear $h$. The kneaders $f$ are removably and adjustably supported on bearings $m$ which with the arms $n$ are seated on the driving cranks $g$, that are set in rotation from the machine driving gear $d$. The arms $n$ are connected through rods $i$ with a pin $k$ around which they oscillate.

This fixed pin $k$ may be arranged in any preferred manner, that is to say mounted either above or below the plane of the crank axis.

If now the cranks $g$ be rotated, the kneaders $f$ are moved, owing to the fixed mounting of the point of connection $h$ alike up and down and towards the middle of the trough $a$, as indicated by the curves shown by chain lines in Fig. 1 and the arrows thereon.

Between the driving device $d$ and worm $e$ according to the invention a coupling is introduced which is so constructed that it is automatically released, as soon as too great a resistance is opposed to the rotary movement of the trough $a$.

In the example of construction shown this coupling is a clutch-coupling with teeth inclined on one side. The one part, the sleeve $r$ is axially movable on the driving shaft $s$ (and is driven in the direction of the arrow in Figure 4) and rotatively connected therewith and engages in a sleeve $t$ that is seated on the shaft $u$ of the worm $e$. The obliquity of the coupling teeth is such that a carrying along or actuating occurs as long as the resistance of the trough does not exceed a certain degree. As soon as this limit is reached and this is the case when the dough is fully kneaded, and consequently is very tough, the sleeve $r$ is pushed away from the sleeve $t$ and held away by a lever $x$.

The re-engaging of the coupling $r$, $t$ is effected by a foot-lever $v$ which is seated on the pivot $w$ of the lever $x$ and engages in a circumferential groove in the sleeve $r$ through the medium of a fork $y$.

The kneading operation proceeds in the following manner:—

After the filling of the trough the kneading arms $f$ are set in rotation and the positive driving means put in engagement by pressing down the foot-lever $v$. After four to six minutes the contents of the trough are mixed and kneaded into dough. When the dough has attained the requisite degree of toughness the tendency of the kneading arms to rotate the trough becomes apparent. The arms act in opposition to the mechanical drive through the shaft $s$ and tend to rotate the trough backwards. If the dough has acquired the requisite toughness, the effect of the kneading arms $f$ has attained such a degree that the clutch-coupling $r$, $t$ is released and therewith the drive through $s$ is put out of engagement. During the first part of the kneading operation the container $a$ is operated by the drive $d$, coupling sleeves $r$ and $t$ intermeshing as shown in Figure 4, the shaft rotating in the direction of the arrow thereon. The friction between the inclined teeth on the two clutch members is sufficient to cause a positive drive of the container $a$ up to the point when the dough becomes too stiff. When the dough is worked to its proper consistency the resistance to rotation becomes greater than the carrying action of the inclined teeth on the coupling members. At this time the drive $d$ is automatically cut out due to movement of member $r$ away from the member $t$. The clutch is held in this disconnected position by the toggle link $x$, until it is again placed in mesh by means of the foot lever $v$. The trough $a$ now rotates only through the working of the kneading arms $f$ and in fact backwards, so that the first working operation, that is, the kneading, rubbing and mixing effect is stopped and the second operation, the airing and the drawing, is begun automatically and in fact in the same manner as carried out by the baker.

I claim,

1. A dough kneading machine for kneading and for aerating dough, comprising, a freely rotatably mounted dough receiving container, two kneading arms mounted for general rotary movement in parallel planes situated on opposite sides of the rotation axis of the container, drive means for operating the arms in opposite directions and for rotating the container and an automatically releasable coupling in the drive for the container which is released upon reaching a predetermined torsional stress.

2. A dough kneading machine for kneading and for aerating dough, comprising, a freely rotatably mounted dough receiving container, two kneading arms mounted for general rotary movement in parallel planes situated on opposite sides of the rotation axis of the container, drive means for operating the arms in opposite directions and for rotating the container and an automatically releasable coupling in the drive for the container which is released upon reaching a predetermined torsional stress, the container being driven in a direction opposite to that in which operation of the kneading arms tends to rotate it, whereby, on release of the coupling, the container is rotated, by the arms, in the direction opposite to its positive drive for effecting a drawing and aerating action on the dough.

3. A dough kneading machine for kneading and for aerating dough, comprising, a freely rotatably mounted dough receiving container, two kneading arms mounted for general rotary movement in parallel planes situated on opposite sides of the rotation axis of the container, drive means for operating the arms in opposite directions and for rotating the container and an automatically releasable coupling in the drive for the container which is released upon reaching a predetermined torsional stress, the coupling including, a longitudinally slidable part and a longitudinally fixed part, interengaging teeth on the two parts so inclined in one direction that upon reaching a predetermined torsional stress, the teeth slide over each other to move the slidable part out of engagement with the fixed part.

4. A dough kneading machine for kneading and for aerating dough, comprising, a freely rotatably mounted dough receiving container, two kneading arms mounted for general rotary movement in parallel planes situated on opposite sides of the rotation axis of the container, drive means for operating the arms in opposite directions and for rotating the container and an automatically releasable coupling in the drive for the container which is released upon reaching a predetermined torsional stress, the container being driven in a direction opposite to that in which operation of the kneading arms tends to rotate it, whereby, on release of the coupling, the container is rotated, by the arms, in the direction opposite to its positive drive for effecting a drawing and aerating action on the dough, the coupling including, a longitudinally slidable part and a longitudinally fixed part, interengaging teeth on the two parts so inclined in one direction that upon reaching a predetermined torsional stress, the teeth slide over each other to move the slidable part out of engagement with the fixed part.

5. A dough kneading machine for kneading and for aerating dough, comprising, a freely rotatably mounted dough receiving container, two kneading arms mounted for general rotary movement in parallel planes situated on opposite sides of the rotation axis of the container, drive means for operating the arms in opposite directions and for rotating the container and an automatically releasable coupling in the drive for the container which is released upon reaching a predetermined torsional stress, the coupling including, a longitudinally slidable part and a longitudinally fixed part, interengaging teeth on the two parts so inclined in one direction that upon reaching a predetermined torsional stress, the teeth slide over each other to move the slidable part out of engagement with the fixed part, and automatic means for positively holding the coupling parts out of engagement.

6. A dough kneading machine for kneading and for aerating dough, comprising, a freely rotatably mounted dough receiving container, two kneading arms mounted for general rotary movement in parallel planes situated on opposite sides of the rotation axis of the container, drive means for operating the arms in opposite directions and for rotating the container and an automatically releasable coupling in the drive for the container which is released upon reaching a predetermined torsional stress, the container being driven in a direction opposite to that in which operation of the kneading arms tends to rotate it whereby, on release of the coupling, the container is rotated, by the arms, in the direction oposite to its positive drive for effecting a drawing and aerating action on the dough, the coupling including, a longitudinally slidable part and a longitudinally fixed part, interengaging teeth on the two parts so inclined in one direction that upon reaching a predetermined torsional stress, the teeth slide over each other to move the slidable part out of engagement with the fixed part, and automatic means for positively holding the coupling parts out of engagement.

7. A dough kneading machine comprising a dough trough, kneading arms oscillating within said trough, rotary driving means for said trough, and yieldable clutch means for connecting the trough with the driving means, said clutch consisting of obliquely toothed interengaging sleeve members mounted upon aligned shafts, one of the sleeves being yieldable in an axial direction to effect disengagement of the clutch, the teeth being arranged so that a given torsional stress automatically disengages the sleeve members.

8. Dough kneading machine comprising a dough trough, means for rotating said trough through the medium of a yieldable clutch, kneading arms operating in said trough, links connecting said arms to a fixed point on the machine and cranks engaging said arms to effect an oscillatory movement at the operative ends of said arms, the cranks, links, and arms, all operate in parallel planes, and the yieldable clutch acting to effect a reverse rotation of the trough when the dough thickens.

In testimony whereof I affix my signature.

EMIL LORCH.